US008462795B2

(12) United States Patent
Wang et al.

(10) Patent No.: US 8,462,795 B2
(45) Date of Patent: Jun. 11, 2013

(54) METHOD AND DEVICE FOR TRANSMITTING CONTROL MESSAGE BASED ON MULTI-RING ETHERNET

(75) Inventors: Bin Wang, Shenzhen (CN); Shaoyong Wu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 205 days.

(21) Appl. No.: 13/060,678

(22) PCT Filed: Dec. 29, 2008

(86) PCT No.: PCT/CN2008/073830
§ 371 (c)(1),
(2), (4) Date: Feb. 24, 2011

(87) PCT Pub. No.: WO2010/022576
PCT Pub. Date: Mar. 4, 2010

(65) Prior Publication Data
US 2011/0158241 A1 Jun. 30, 2011

(30) Foreign Application Priority Data
Aug. 28, 2008 (CN) .......................... 2008 1 0213924

(51) Int. Cl.
*H04L 12/28* (2006.01)
(52) U.S. Cl.
USPC ........................ 370/395.53; 370/223; 709/249
(58) Field of Classification Search
USPC .............................. 370/395.53, 223; 709/249
See application file for complete search history.

(56) References Cited

U.S. PATENT DOCUMENTS

| | | | |
|---|---|---|---|
| 6,963,575 B1 * | 11/2005 | Sistanizadeh et al. | 370/404 |
| 7,126,921 B2 | 10/2006 | Mark | |
| 2002/0167900 A1 | 11/2002 | Mark et al. | |
| 2004/0098505 A1 | 5/2004 | Clemmensen | |
| 2008/0279133 A1 * | 11/2008 | Bienfait et al. | 370/315 |
| 2009/0031041 A1 | 1/2009 | Clemmensen | |
| 2009/0052317 A1 * | 2/2009 | Takagi et al. | 370/223 |

FOREIGN PATENT DOCUMENTS

| | | |
|---|---|---|
| CN | 1645834 A | 7/2005 |
| CN | 1714548 A | 12/2005 |
| CN | 1980145 A | 6/2007 |

OTHER PUBLICATIONS

International Search Report in international application No. PCT/CN2008/073830, mailed on Jun. 11, 2009.
English Translation of the Written Opinion of the International Search Authority in international application number: PCT/CN2008/073830, mailed on Jun. 11, 2009.

* cited by examiner

*Primary Examiner* — Wei Zhao
(74) *Attorney, Agent, or Firm* — Oppendahl Patent Law Firm LLC

(57) ABSTRACT

A method and device for transmitting a control message based on a multi-ring Ethernet are provided, wherein the method comprises the following steps: control virtual local area networks of a main ring and a sub-ring are configured (S1002); and a main ring node receives a sub-ring control message from the sub-ring, forwards the sub-ring control massage to the other main ring nodes on the main ring via a data plane, and synchronously realizes the blocking or opening of the sub-ring control message and a data message in the data plane (S1004). The present disclosure solves the problem that the time for the main ring node to process the sub-ring control message is too long during existing control message transmission process, avoids the control message loop situation caused by the transmission of the sub-ring control message over the main ring, and improves the network performance.

7 Claims, 11 Drawing Sheets

METHOD AND DEVICE FOR TRANSMITTING CONTROL MESSAGE BASED ON MULTI-RING ETHERNET

TECHNICAL FIELD

The present invention relates to the field of communications, and particularly to a method and device for transmitting a control message based on a multi-ring Ethernet.

BACKGROUND

Protection technologies, which are mainly used for realizing a redundancy backup between a main path and a backup path, have been extensively employed in the practical application of an Ethernet. When the main path and the backup path are both in good condition, the protected data forwarding function of the backup path is disabled, and the protected data between networks are transmitted on the main path. When the main path is failed, the protected data forwarding function of the backup path is enabled, and the transmission of the protected data between networks is switched to be completed by the backup path. the above protection processing is capable of preventing the protected data from being received repeatedly or generating a broadcast storm when the network is in a normal state, and capable of activating the backup path to transmit the protected data when the main path of the network is failed, then the failure resistance of the Ethernet is improved, and the high real-time requirement on a convergence time of shorter than 50 ms during a switching is met.

An example is given below for illustrating the implementation process of the protection technologies for a multi-ring Ethernet. FIG. 1 is a schematic diagram illustrating the topology of a multi-ring Ethernet according to related technologies. As shown in FIG. 1, nodes S1-S6 are all Ethernet switches. Node S1 is correspondingly provided with ports 11 and 12; node S2 is correspondingly provided with ports 21, 22 and 23; node S3 is correspondingly provided with ports 31, 32 and 33; node S4 is correspondingly provided with ports 41, 42 and 43; node S5 is correspondingly provided with ports 51, 52 and 53; node S6 is correspondingly provided with ports 61 and 62; network B is connected with node S2; and network A is connected with node S5. Four physical communication paths are provided between network A and network B, i.e. path 1: network A<->node S5<->node S3<->node S2<->network B; path 2: network A<->node S5<->node S3<->node S4<->node S1<->node S2<->network B; path 3: network A<->node S5<->node S6<->node S4<->node S3<->node S2<->network B; and path 4: network A<->node S5<->node S6<->node S4<->node S1<->node S2<->network B.

In the application of the protection technologies for a multi-ring Ethernet, a ring network domain is defined firstly. FIG. 2 is a schematic diagram illustrating the topology of a communication path when links in a multi-ring Ethernet are in good condition according to related technologies. As shown in FIG. 2, a main ring and a sub-ring are included in a ring network domain. The main ring includes nodes S1-S4 and includes links between nodes S1 and S2, between nodes S2 and S3, between nodes S3 and S4, and between nodes S4 and S1. The sub-ring includes nodes S3, S5, S6 and S4 and includes links between nodes S3 and S5, between nodes S5 and S6, and between nodes S6 and S4. Moreover, a ring protection link, main nodes (or known as control nodes) the ring protection link belongs to, and main ports and slave ports of the main nodes are also defined, wherein a link directly connected with the slave ports of a main node is a ring protection link. The main node of the main ring is S1, which correspondingly has a main port 12 and a slave port 11; and the main node of the sub-ring is S6, which correspondingly has a main port 61 and a slave port 62. When links in the ring network domain of the multi-ring Ethernet are in good condition, the main nodes of the main ring and the sub-ring disable the protected data forwarding function of the slave ports, node S1 disables the protected data forwarding function of slave port 11, and node S6 disables the protected data forwarding function of slave port 62, then the communication path between networks B and A is as follows: network B<->node S2<->node S3<->node S5<->network A.

FIG. 3 is a schematic diagram illustrating the topology of a communication path when a link failure occurs in a multi-ring Ethernet according to related technologies. As shown in FIG. 3, node S1 in a main ring is a main node, port 12 of node S1 is a main port, port 11 of node S1 is a slave port, and a link directly connected with port 11 is a ring protection link of the main ring; and node S6 in a sub-ring is a main node, port 61 of node S6 is a main port, port 62 of node S6 is a slave port, and a link directly connected with port 62 is a ring protection link of the sub-ring. Under normal condition, the main nodes of the main ring and the sub-ring disable the protected data forwarding function of their slave ports to avoid the transmission of the protected data on a protection link so as to prevent the repeated forwarding of the protected data and the occurrence of a broadcast storm. If a link failure occurs in the ring network domain of the multi-ring Ethernet and the failed link is not a protection link, then the main nodes enable the protected data forwarding function of the slave ports, each node is required to refresh an address forwarding table, and the communication between networks is carried out on a new path. As shown in FIG. 3, in the event that the link between nodes S2 and S3 on the main ring is failed, after detecting the link failure, node S2 disables the data forwarding function of port 22 and notifies other nodes of the link failure, then node S1 enables the protected data forwarding function of port 11 after receiving the failure notice; is in addition, each node in the ring network domain is required to refresh an address forwarding table, and the new communication path between networks B and A is as follows: network B<->node S2<->node S1<->node S4<->node S3<->node S5<->network A.

A recovery switching is needed when the failed link in the ring network domain of the multi-ring Ethernet is recovered so that the network transmission is recovered to be performed on the transmission path used under normal condition, and as the path is changed, the nodes are required to refresh the address forwarding table.

A large number of control messages are transmitted in a control virtual local area network (VLAN for short) in the ring network domain when the multi-ring Ethernet is in maintenance or protection switching. There are two kinds of control VLANs: a main control VLAN corresponding to a main ring, and a sub-control VLAN corresponding to a sub-ring. Control messages of the main ring are transmitted in the main control VLAN, while control messages of the sub-ring are transmitted in the sub-control VLAN. FIG. 4 is a schematic diagram illustrating the control VLANs of the main ring and the sub-ring of the multi-ring Ethernet according to related technologies. As shown in FIG. 4, the main control VLAN is VLAN 3, the sub-control VLAN is VLAN 4, the ring network port of the main ring belongs to both VLAN 3 and VLAN 4, and the ring network port of the sub-ring only belongs to VLAN 4. Under this mechanism, control messages of the main ring are forwarded only inside the main ring, while control messages of the sub-ring can be transmitted through the main ring. Although the system operation is simplified based on the transmission mode in which control messages of the sub-ring can be transmitted through the main ring, this mechanism has the following two problems.

Problem 1: the processing of a main ring node on a protocol message (i.e., a control message) of the sub-ring needs extra time, which clashes with the high real-time requirement of the multi-ring Ethernet on a convergence time of shorter than 50 ms during a networking switching. This problem is described below in combination with FIG. 5 and FIG. 6. In FIG. 5 and FIG. 6, a main ring is a ring including nodes S1-Sn, wherein node S1 is a main node, port 12 of node S1 is a slave port, and a link directly connected with slave port 12 is a ring protection link of the main ring; and a sub-ring is a ring including nodes M1, M2, S2 and S3, wherein nodes M1 is a main node of the sub-ring, port 12 of node M1 is a slave port, and a link directly connected with slave port 12 is a ring protection link of the sub-ring.

FIG. 5 is a first schematic diagram illustrating a control message forwarding analysis carried out when a link of a sub-ring is in a protection switching according to related technologies. As shown in FIG. 5, a link between nodes M2 and S2 is failed if a loop of a sub-ring is failed, after detecting the failure, the adjacent nodes M2 and S2 disable the data forwarding function of the protected VLANs of port 21 of node M2 and port 23 of node S2, and nodes M2 and S2 send a control message LINK-DOWN to main node M1 of the sub-ring. During this phase, the control message LINK-DOWN is processed on the main ring node for $2\delta$ ($\delta$ is the control message processing time of a single node).

FIG. 6 is a second schematic diagram illustrating a control message forwarding analysis carried out when a link of a sub-ring is in a protection switching according to related technologies. As shown in FIG. 6, after receiving the control message LINK-DOWN, main node M1 enables the VLAN-protecting data forwarding function of a slave port and sends a control message FLUSH-DOWN to notify each node to update an MAC (media access control) address, and each node updates the MAC address, then a failure switching is completed. In this phase, the control message FLUSH-DOWN of the sub-ring is processed on the main ring node for $n\delta$ (n is the number of the nodes on the main ring, and $\delta$ is the control message processing time of a single node). Therefore, when the multi-ring Ethernet is in a protection switching, the control message of the sub-ring is processed by a node for $(n+2)\delta$ in the main ring.

FIG. 7 is a first schematic diagram illustrating a control message forwarding analysis carried out when a failed link of a sub-ring is in a recovery switching according to related technologies. As shown in FIG. 7, when a failed link is recovered, the link failure between nodes S2 and M2 is removed, the adjacent nodes S2 and M2 detect the failure removal, a control message HELLO sent by main node M1 of the sub-ring passes through the failure-removed link, and slave port 12 of main node M1 detects the message HELLO sent by itself. And a protected VLAN-protecting data message can still pass through the slave port of main node M1, the protection protocol of the multi-ring Ethernet is not switched, and no frame is lost. In this phase, the control message HELLO of the sub-ring is processed on a main ring node for $2\delta$ ($\delta$ is the control message processing time of a single node), and a switching is started after the message HELLO is received by main node M1.

FIG. 8 is a second schematic diagram illustrating a control message forwarding analysis carried out when a failed link of a sub-ring is in a recovery switching according to related technologies. As shown in FIG. 8, main node M1 disables the VLAN-protecting data forwarding function of a slave port and sends a message FLUSH-UP to notify each node to carry out a recovery switching, the failure-removed link enables the VLAN-protecting data forwarding function of a corresponding port, and each node updates its MAC address, then the recovery switching is completed. In this phase, a control message FLUSH-UP of the sub-ring is processed on a main ring node for $n\delta$ (n is the number of the nodes on the main ring, and $\delta$ is the control message processing time of a single node). Therefore, it can be seen that a control message of the sub-ring is processed by a node for $(n+2)\delta$ in a main ring when a multi-ring Ethernet is in a recovery switching.

It can be seen from the above example that the sub-ring control message processing time $\delta$ of a main ring node has a significant influence on the switching time of a multi-ring Ethernet, so the proposal of a new processing mode for the main ring node to process a sub-ring control message has extraordinary meaning in improving the performance of a multi-ring Ethernet.

Problem 2: a data loop is easily caused by control messages of the sub-ring. FIG. 9 is a schematic diagram illustrating the generation of a loop by control messages of a sub-ring in a main ring according to related technologies. As shown in FIG. 9, a main ring consists of nodes S1-S6, and a sub-ring consists of nodes S2, S3, S7 and S8. Under normal condition, slave port 12 of main node S1 on the main ring is blocked for data VLAN (but not for a control message) to prevent the protected data generating a broadcast storm; and for the same sake, slave port 72 of main node S7 on the sub-ring is also blocked for data VLAN (but not for a control message). After the sub-ring is failed, main node S7 of the sub-ring sends a message HELLO from its main port 71 to detect whether the loop is recovered, and the loop is considered recovered if node S7 can receive the message HELLO from its slave port within a given period of time. After sent from the main node of the sub-ring, the control message HELLO of the sub-ring is transmitted on the following paths: path 1: the main port of node S7<->node S8<-> node S2<->node S3<->the slave port of node S7; and path 2: the main port of node S7<->node S8<->node S2<->node S1<->node S6<->node S5<->node S4<->node S3<->node S2. In path 2, the control message HELLO of the sub-ring forms a data loop in the main ring because slave port 12 of main node S1 on the main ring is blocked for a data message but not for a control message under normal condition; after receiving the message HELLO of the sub-ring, slave port 12 of main node S1 determines whether the message HELLO is a control message of the main ring; if not, the message HELLO is immediately forwarded from the main port, then it leads to a repeated forwarding of the message HELLO in the main ring, a bandwidth waste of the main ring, and even the generation of a broadcast storm by the control message of the sub-ring on the main ring if the situation gets worse.

It can be seen from above description that a main ring node needs extra time to process a control message of a sub-ring in existing control message transmission process, and transmitting the control message of the sub-ring on a main ring will cause a loop problem. However, no effective solution has been provided yet to solve the problems

SUMMARY

Aiming to solve at least one of the problems that a main ring node needs extra time to process a control message of a sub-ring in existing control message transmission process, and that the transmission of the control message of the sub-ring on a main ring will cause a loop problem, the present invention provides a method and device for transmitting a control message based on a multi-ring Ethernet.

According to an aspect of the present invention, a method for transmitting a control message based on a multi-ring Ethernet is provided.

According to the method for transmitting a control message based on a multi-ring Ethernet, the multi-ring Ethernet comprises: a main ring having a plurality of main ring nodes and a sub-ring having a plurality of sub-ring nodes, the plurality of main ring nodes include a main ring control node, and the plurality of sub-ring nodes include a sub-ring control node; the method comprises the following steps: control virtual local area networks of the main ring and the sub-ring are configured; specially: configuring the control virtual local area network of the main ring in the main ring; and configuring the control virtual local area network of the sub-ring in the sub-ring and/or a virtual channel located between interconnection nodes of the main ring and provided for a sub-ring protocol message, wherein the interconnection nodes are the common nodes between the rings of the Ethernet; and a main ring node receives a sub-ring control message from the sub-ring, forwards the sub-ring control passage to the other main ring nodes on the main ring via a data plane, and synchronously realizes the blocking or opening of the sub-ring control message and a data message in the data plane.

Preferably, the step that control virtual local area networks of the main ring and the sub-ring are configured may specifically comprise: configuring the control virtual local area network of the main ring, involving all the ports on the main ring; and configuring the control virtual local area network of the sub-ring, involving all the ports on the sub-ring and the main ring.

Preferably, after configuring the control virtual local area networks of the main ring and the sub-ring, the method may further comprise determining whether all the links of the main ring are normal.

Preferably, if the links of the main ring are determined normal, the method may further comprise: if the main ring node receiving the sub-ring control message is the main ring control node, then a slave port of the main ring control node blocks the forwarding of the data message and the sub-ring control message; and if the main ring node receiving the sub-ring control message is not the main ring control node, then the main ring node forwards the sub-ring control message via the data plane.

Preferably, if one of the links of the main ring is determined failed, the method may further comprise: if the main ring node receiving the sub-ring control message is the main ring control node, then a slave port of the main ring control node forwards the data message and the sub-ring control message; if the main ring node receiving the sub-ring control message is not the main ring control node, then a further determination is made on whether the main ring control node receiving the sub-ring control message is a node adjacent to the failed link; if yes, then the port of the node adjacent to the failed link blocks the data message and the sub-ring control message; and otherwise, the main ring node forwards the sub-ring control message via the data plane.

Preferably, before forwarding the sub-ring control message, the method may further comprise: determining whether the sub-ring control message needs a control plane processing; and transmitting the sub-ring control message to the control plane if the sub-ring control message needs a control plane processing.

According to another aspect of the present invention, a device for transmitting a control message based on a multi-ring Ethernet is provided.

According to a device for transmitting a control message based on a multi-ring Ethernet, the multi-ring Ethernet comprises: a main ring having a plurality of main ring nodes and a sub-ring having a plurality of sub-ring nodes, the plurality of main ring nodes include a main ring control node, and the plurality of sub-ring nodes include a sub-ring control node; the device comprises: a configuration module which is used for configuring control virtual local area networks of the main ring and the sub-ring; a receiving module which is used for receiving a sub-ring control message from the sub-ring; and a forwarding module which is used for forwarding the sub-ring control message to the other main ring nodes in the main ring via a data plane.

Preferably, the configuration module may specifically comprise: a first configuration sub-module which is used for configuring the control virtual local area network of the main ring, and the configuration involves all the ports on the main ring; a second configuration sub-module which is used for configuring the control virtual local area network of the sub-ring, and the configuration involves all the ports on the main ring and the sub-ring.

Preferably, the device may further comprise: a first determination module which is used for determining whether all the links of the main ring are normal; and a blocking module which is used for blocking the forwarding of a data message and the sub-ring control message.

Preferably, the device may further comprise: a second determination module which is used for determining whether the sub-ring control message needs a control plane processing; and a sending module which is used for sending the sub-ring control message to a control plane.

In the present invention, the sub-ring control message is forwarded by the main ring node via the data plane, which avoids the latency of a sub-ring control message processing performed by a control plane, and thus solves the problem that the time for the main ring node to process the sub-ring control message is too long during existing control message transmission process, avoids the control message loop situation caused by the transmission of the sub-ring control message over the main ring, and improves the network performance.

BRIEF DESCRIPTION OF THE DRAWINGS

The drawings illustrated herein are provided for a better understanding of the present invention and form one part of this application, the exemplary embodiments and the description thereof are provided to explain the present invention but not to limit the present invention. In the drawings.

DETAILED DESCRIPTION

Function Overview

The present invention provides a mechanism for the transmission of a sub-ring control message of a multi-ring Ethernet in a main ring, in which during the transmission of the sub-ring control message in the main ring, the forwarding of the sub-ring control message is in the charge of the data plane of the nodes on the main ring, irrelative to a control plane. A main ring protection link can block the sub-ring control message. In other words, the part of a sub-control VLAN corresponding to a sub-ring in the main ring has the features of data VLAN, the following two processing modes are provided for the message of a sub-control VLAN arriving at a main ring node: (1) the message is forwarded via the data plane and synchronously copied to the control plane to be analyzed; (2) the message is forwarded via the data plane but not copied to a control plane for a further processing. By applying the method for transmitting a sub-ring control message in a main ring, the control message processing time of the main ring node is shortened, the convergence speed is improved during a link switching, and the sub-ring control message is prevented from forming a loop in the main ring.

The present invention will be described below in detail with reference to the drawings in combination with embodiments.

Method Embodiments

According to an embodiment of the present invention, a method for transmitting a control message based on a multi-ring Ethernet is provided, wherein the multi-ring Ethernet comprises: a main ring having a plurality of main ring nodes and a sub-ring having a plurality of sub-ring nodes, wherein the plurality of main ring nodes include a main ring control node (i.e., a main node), and the plurality of sub-ring nodes include a sub-ring control node.

Figure 1:
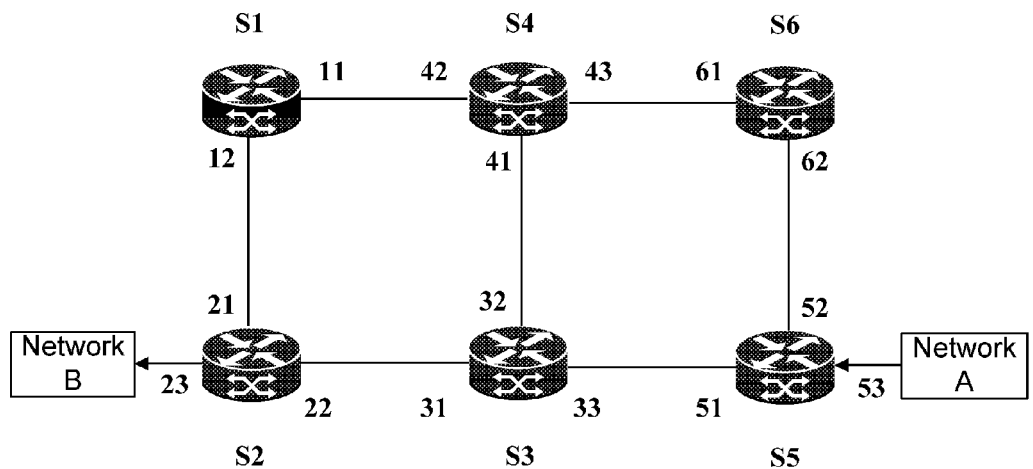
FIG. 1 is a schematic diagram illustrating the topology of a multi-ring Ethernet according to related technologies.
Figure 2:
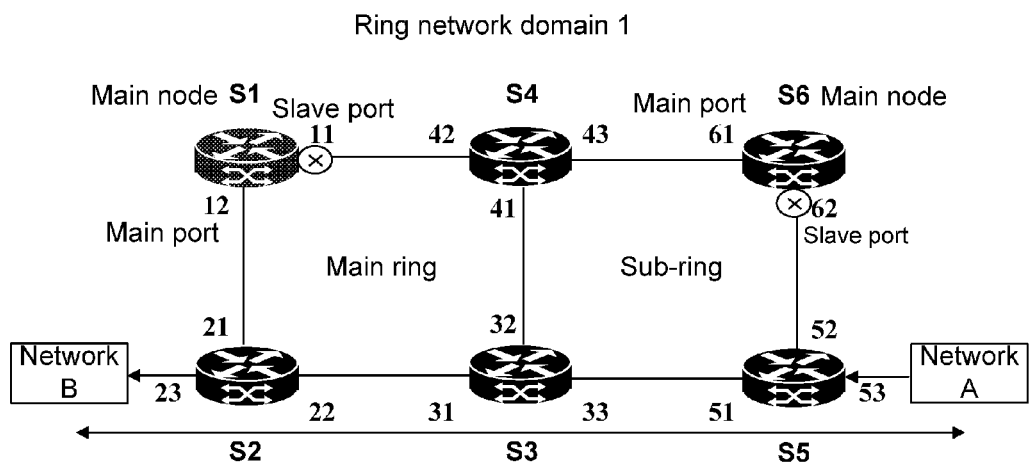
FIG. 2 is a schematic diagram illustrating the topology of a communication path when links in a multi-ring Ethernet are in good condition according to related technologies.
Figure 3:
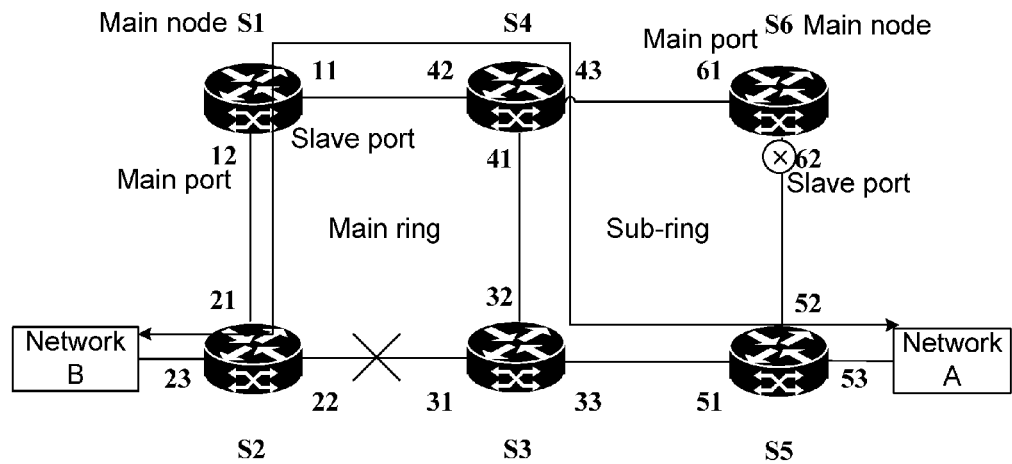
FIG. 3 is a schematic diagram illustrating the topology of a communication path when a link failure occurs in a multi-ring Ethernet according to related technologies.
Figure 4:
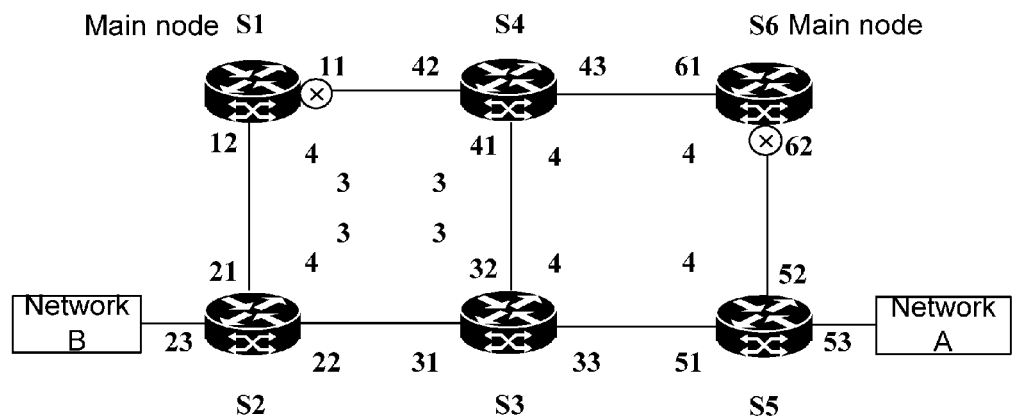
FIG. 4 is a schematic diagram illustrating the control VLANs of the main ring and the sub-ring of a multi-ring Ethernet according to related technologies.
Figure 5:
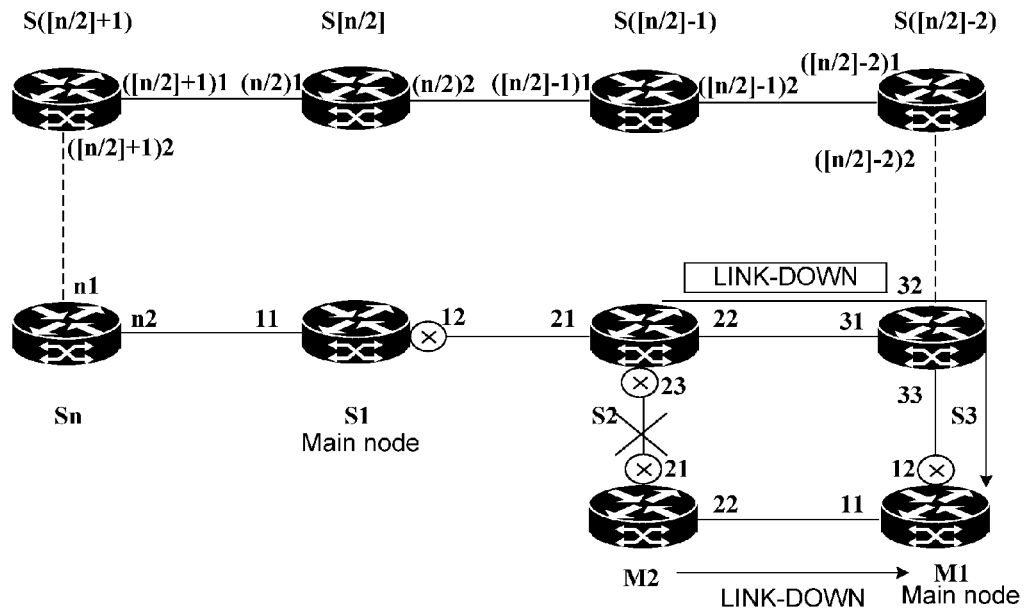
FIG. 5 is a first schematic diagram illustrating a control message forwarding analysis carried out when a link of a sub-ring is in a protection switching according to related technologies.
Figure 6:
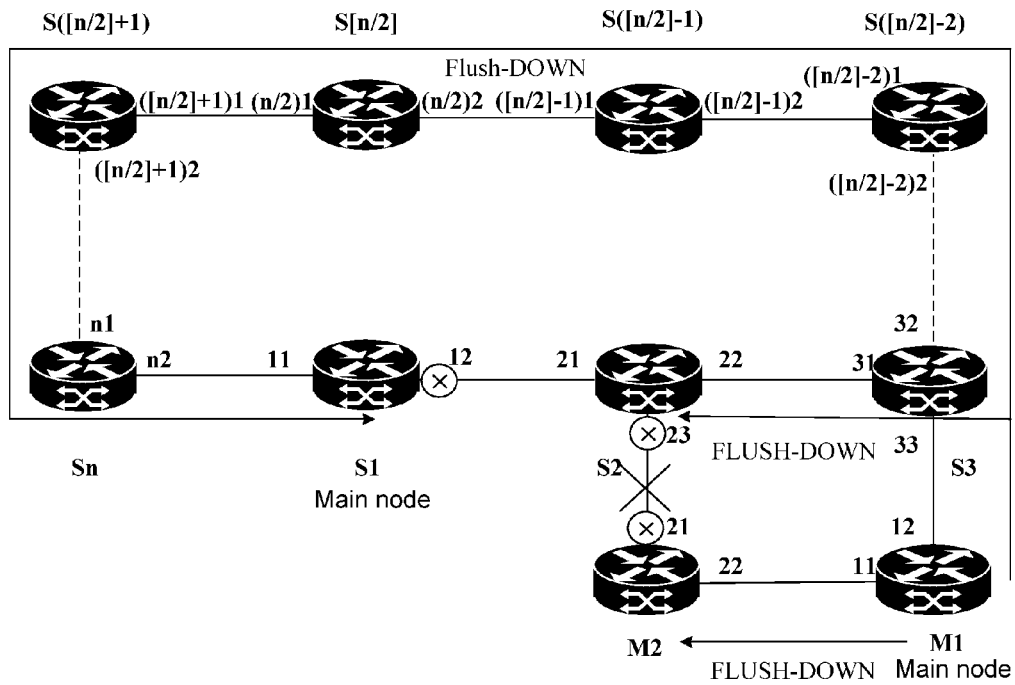
FIG. 6 is a second schematic diagram illustrating a control message forwarding analysis carried out when a link of a sub-ring is in a protection switching according to related technologies.
Figure 7:
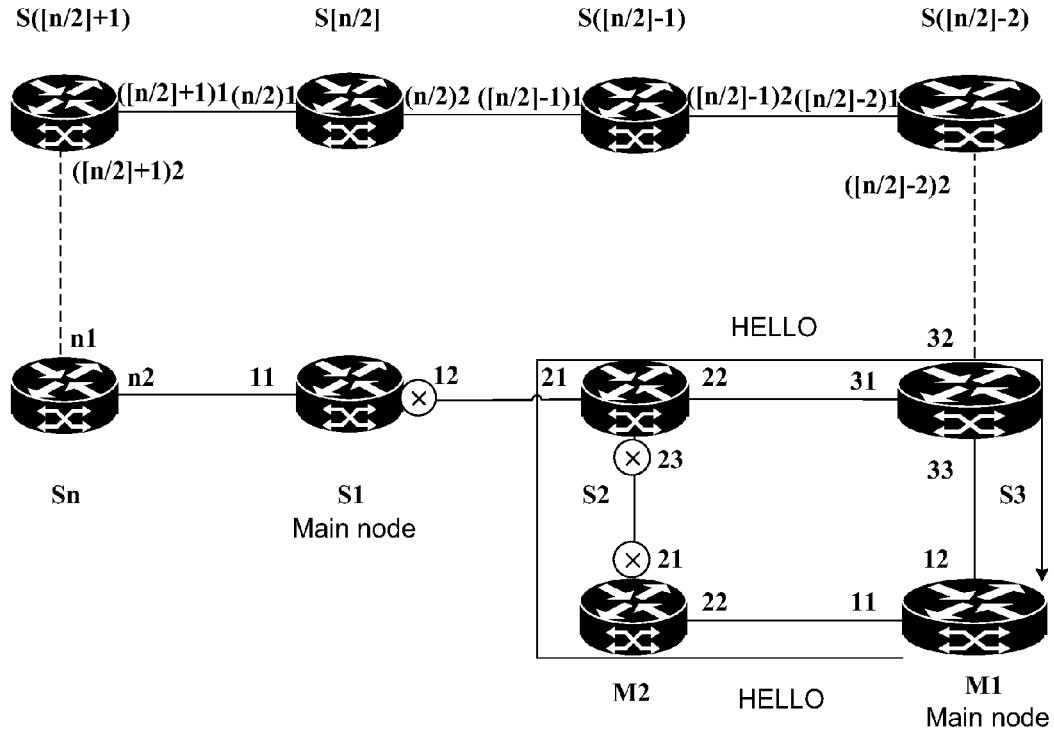
FIG. 7 is a first schematic diagram illustrating a control message forwarding analysis carried out when a failed link of a sub-ring is in a recovery switching according to related technologies.
Figure 8:
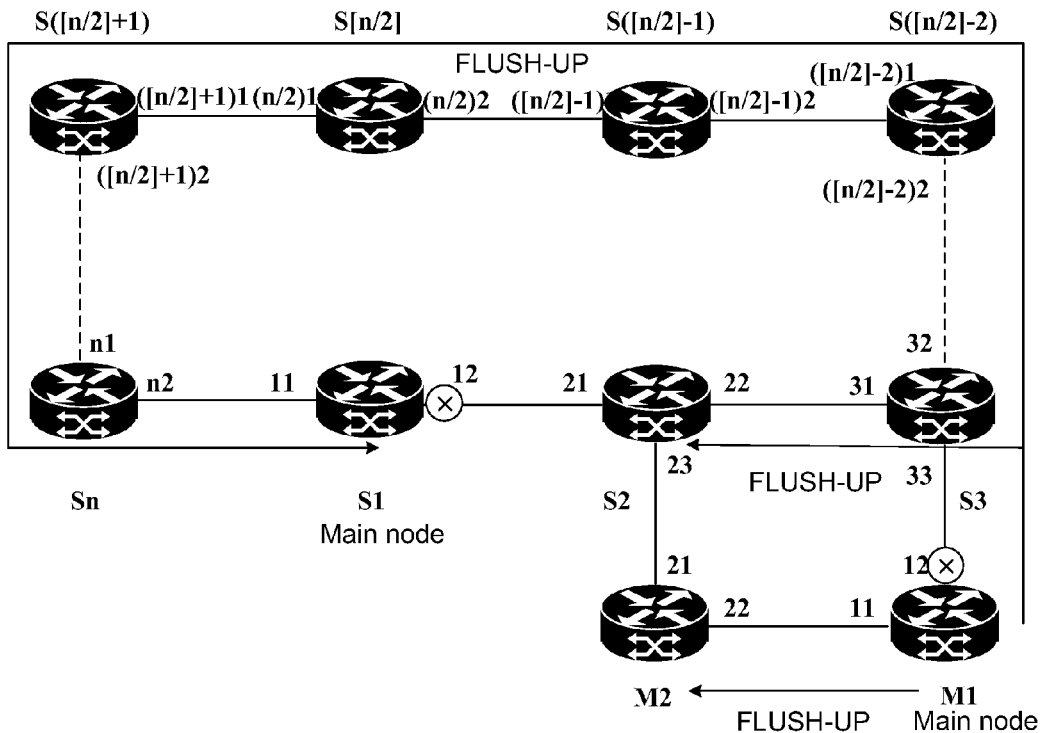
FIG. 8 is a second schematic diagram illustrating a control message forwarding analysis carried out when a failed link of a sub-ring is in a recovery switching according to related technologies.
Figure 9:
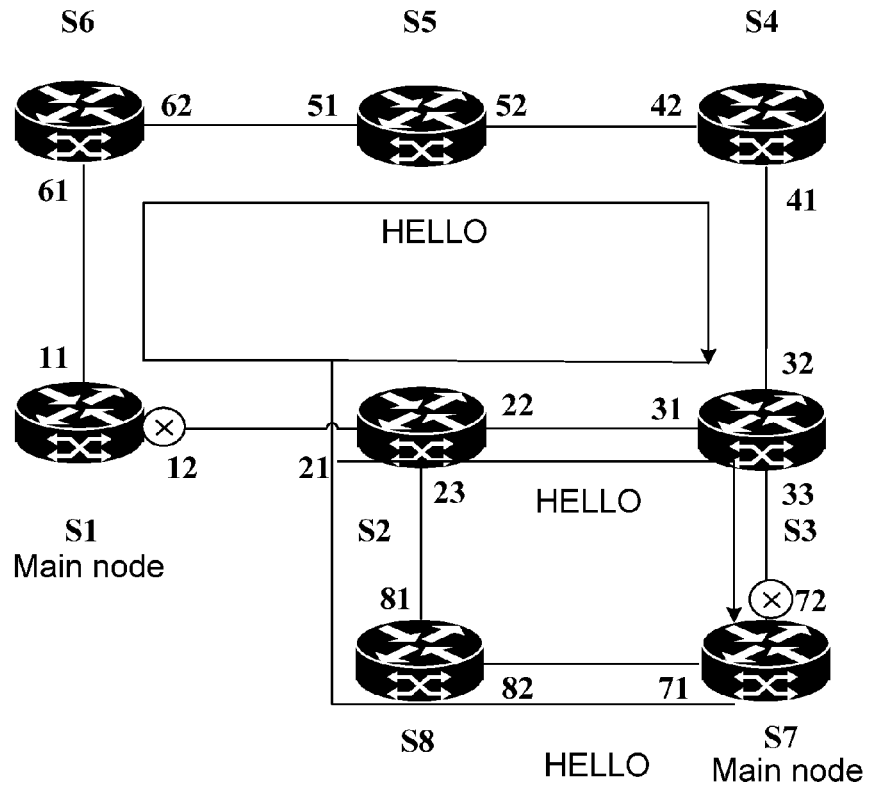
FIG. 9 is a schematic diagram illustrating the generation of a loop by control messages of a sub-ring in a main ring according to related technologies.
Figure 10:
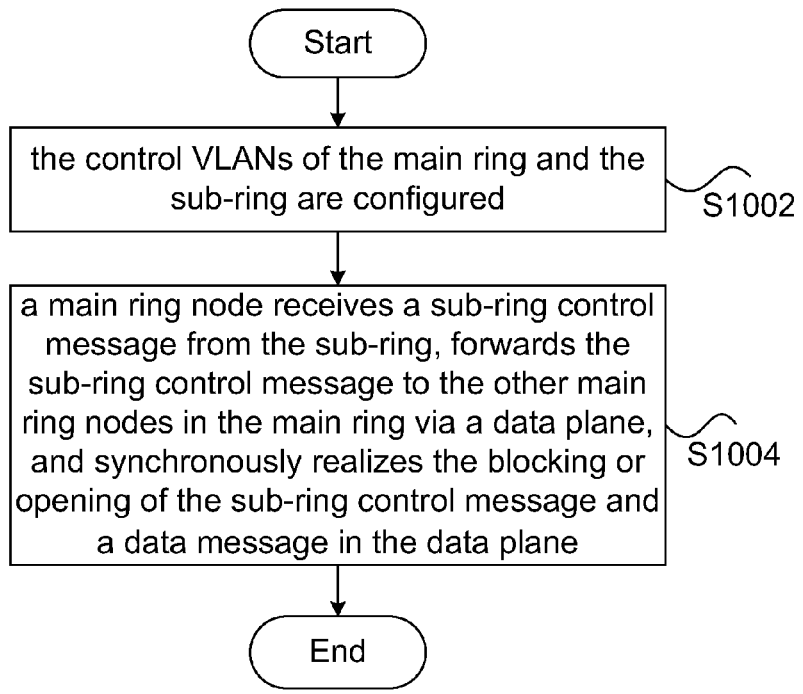
FIG. 10 is a flow chart of a method for transmitting a control message based on a multi-ring Ethernet according to an embodiment of the present invention.

FIG. 10 is a flow chart of the method for transmitting a control message based on a multi-ring Ethernet according to an embodiment of the present invention. As shown in FIG. 10, the method comprises the following steps.

Step S1002, control VLANs of a main ring and a sub-ring are configured, wherein the configuration of the control VLAN of the main ring involves all the ports on the main ring, and the configuration of the control VLAN of the sub-ring involves all the ports on the main ring and the sub-ring;

Step S1004, a main ring node receives a sub-ring control message from the sub-ring, forwards the sub-ring control message to the other main ring nodes on the main ring via a data plane, and synchronously realizes the blocking or opening of the sub-ring control message and a data message in the data plane; in this step, the main ring node directly forwards the sub-ring control message to the other main ring nodes via the data plane, compared with the prior art, there is no need for the main ring node to send the sub-ring control message to a control plane via the data plane, wait the control plane to process the sub-ring control message and then forward the sub-ring control message.

Wherein configuring the control VLANs of the main ring and the sub-ring specifically comprises: configuring the control VLAN of the main ring in the main ring; configuring the control VLAN of the sub-ring in the sub-ring, and/or a virtual channel located between interconnection nodes of the main ring and provided for a sub-ring protocol message, wherein the interconnection nodes are the common nodes between the rings of the Ethernet.

Preferably, before the sub-ring control message is forwarded, a determination is made on whether the sub-ring control message needs a control plane processing; if yes, the sub-ring control message is sent to the control plane.

In this embodiment, the main ring node can directly forward the sub-ring control message via the data plane without waiting the control plane to process the sub-ring control message, thereby the problem existing in the current control message transmission process that the time for a main ring node to process a sub-ring control message is too long is solved and the control message loop situation caused by the transmission of a sub-ring control message on the main ring is avoided, and the performance of the network is consequentially improved.

The present invention will be described below in detail in combination with embodiments.

Embodiment 1

Figure 11:
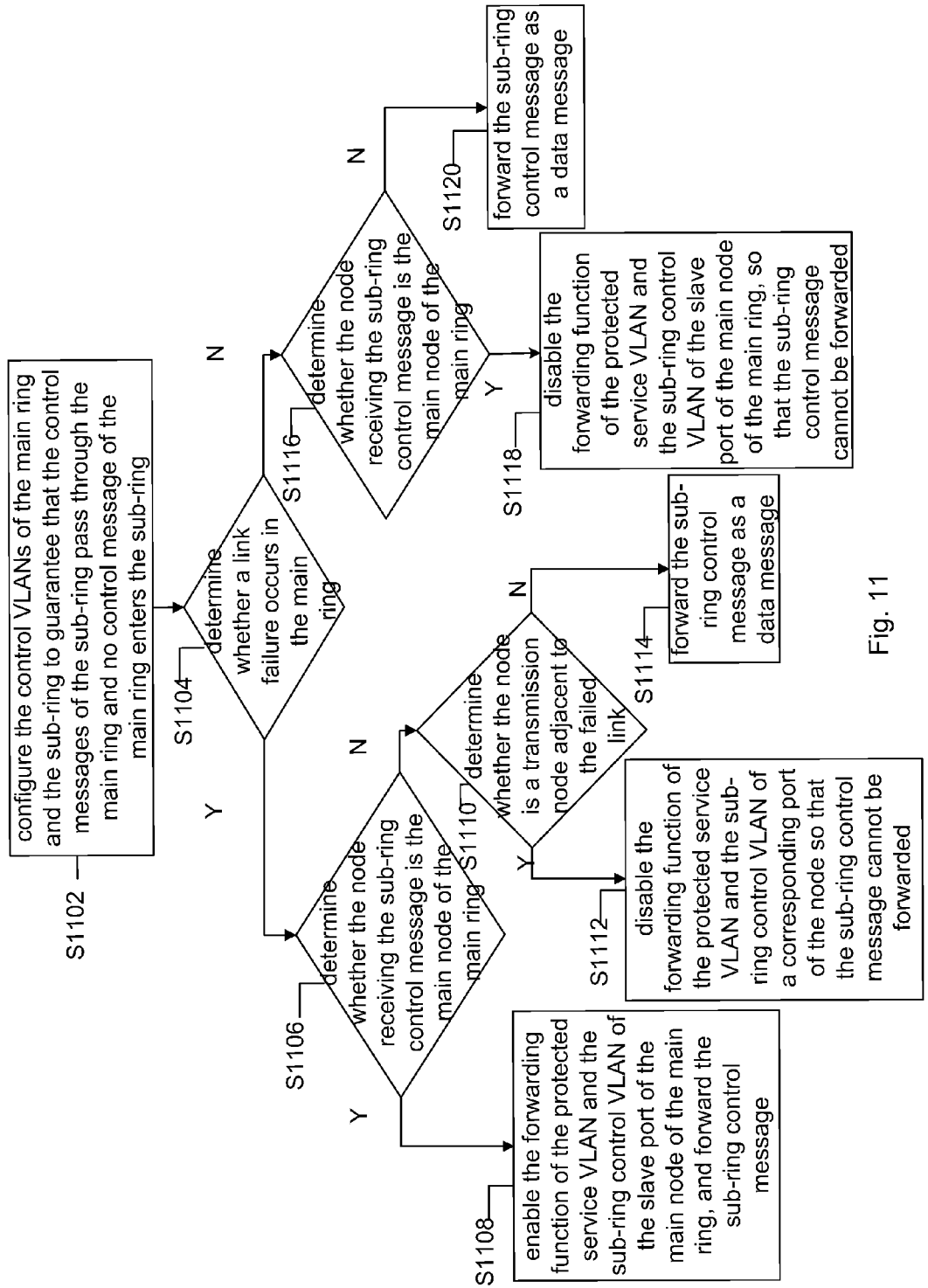
FIG. 11 is a detailed flow chart of a method for transmitting a control message based on a multi-ring Ethernet according to an embodiment 1 of the present invention.

FIG. 11 is a detailed flow chart of a method for transmitting a control message based on a multi-ring Ethernet according to Embodiment 1 of the present invention. As shown in FIG. 11, the sub-ring control message processing of the multi-ring Ethernet in the main ring comprises the following steps.

Figure 12:
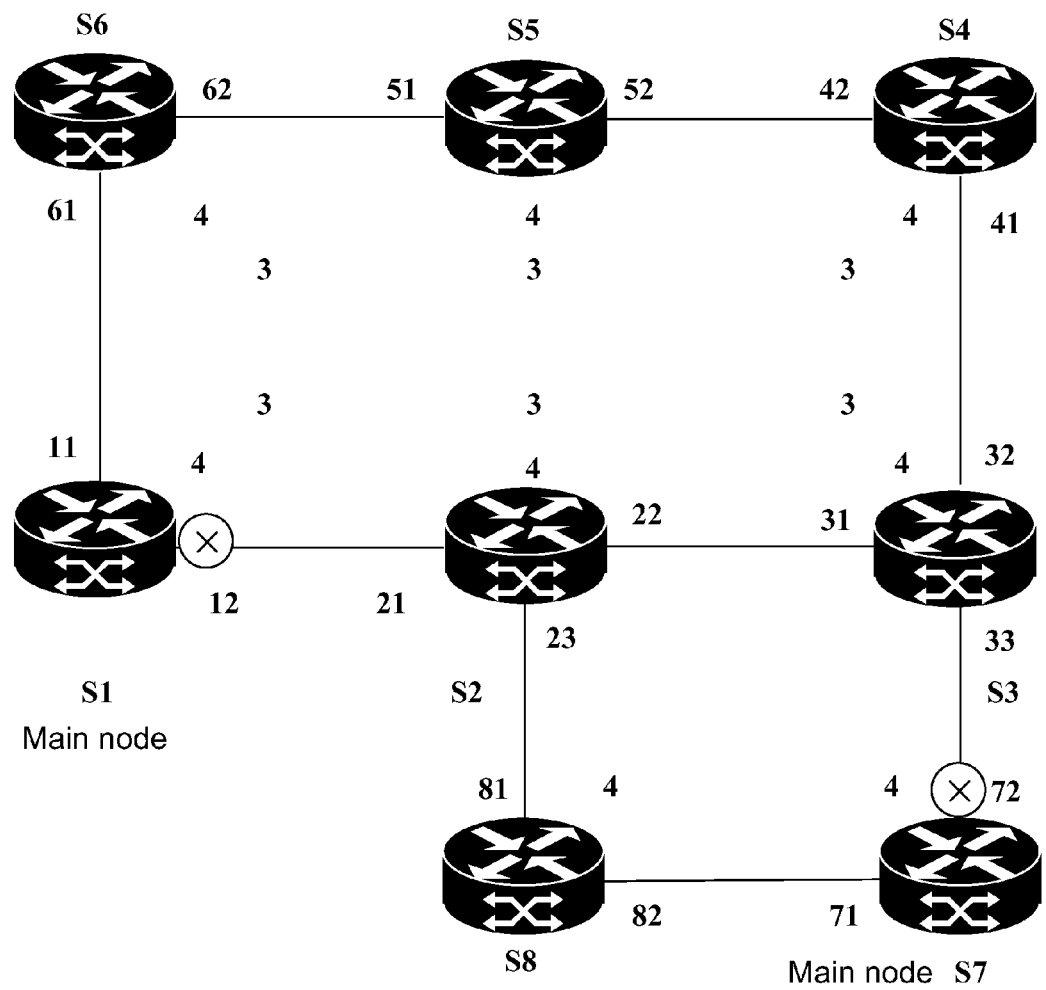
FIG. 12 is a first schematic diagram illustrating the topology of a multi-ring Ethernet according to Embodiment 1 of the present invention.

Step S1102, control VLANs of a main ring and a sub-ring are configured in a multi-ring Ethernet to guarantee that a control messages of the sub-ring pass through the main ring and no control message of the main ring enters the sub-ring. FIG. 12 is a first schematic diagram illustrating the topology of a multi-ring Ethernet according to Embodiment 1 of the present invention. As shown in FIG. 12, a main control VLAN is VLAN 3 including nodes S1-S6, a sub-control VLAN is VLAN 4 including nodes S1-S8; wherein node S1 is a main node of the main ring, a link directly connected with port 12 of node S1 is a ring protection link of the main ring; node S7 is a main node of the sub-ring, and a link directly connected with port 72 of node S7 is a ring protection link of the sub-ring.

Step S1104, a determination is made on whether a link failure occurs in the main ring; if yes, then step S1106 is executed; otherwise, step S1116 is executed.

Step S1106, if a single point failure occurs on one of the links of the main ring, then each node on the main ring determines whether the message is a control message of the sub-ring via a corresponding domain field in the message head; if yes, then determine whether the node receiving the sub-ring control message is the main node of the main ring, if yes, then step S1108 is executed; otherwise, step S1110 is executed.

Figure 13:
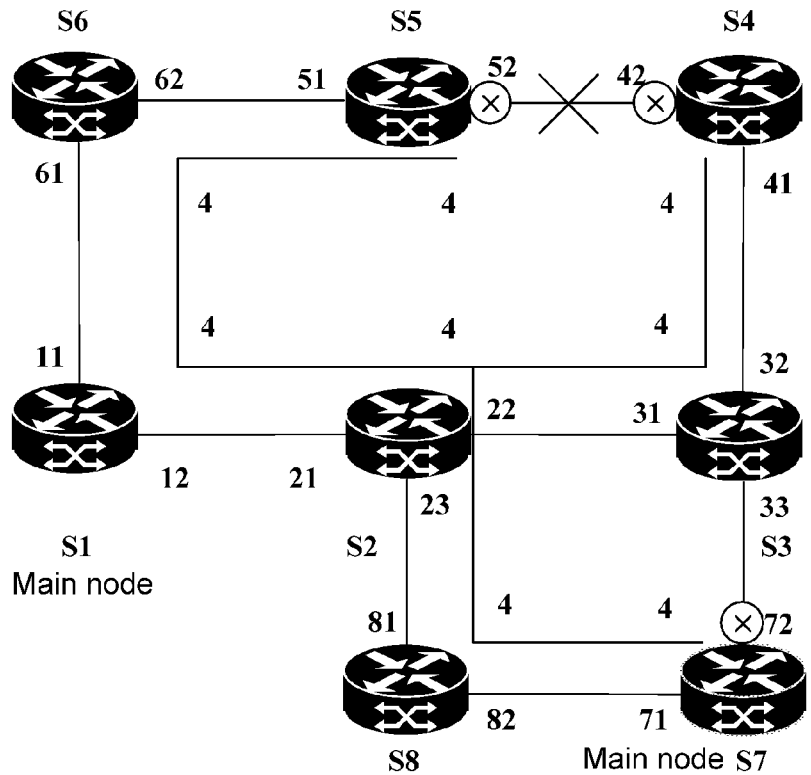
FIG. 13 is a second schematic diagram illustrating the topology of a multi-ring Ethernet according to Embodiment 1 of the present invention.

Step S1108, the main node on the main ring enables the forwarding function of the protected data VLAN and the sub-ring control VLAN of a slave port, FIG. 13 is a second schematic diagram illustrating the topology of a multi-ring Ethernet according to Embodiment 1 of the present invention. As shown in FIG. 13, main node S1 on the main ring enables the forwarding function of the data VLAN and sub-ring control VLAN 4 of slave port 12; and node S1 carries out a hardware forwarding for the control message of sub-ring control VLAN 4 via a data plane so as to shorten the sub-ring control message processing time of the main ring node.

Step S1110, the node receiving the sub-ring control message on the main ring is a transmission node, and a further determination is made on whether the node receiving the sub-ring control message on the main ring is a transmission node adjacent to the failed link, if yes, step S1112 is executed; otherwise, step S1114 is executed.

Step S1112, the transmission node adjacent to the failed link disables the forwarding function of the protected data VLAN and the sub-ring control VLAN; as shown in FIG. 13, the two ports adjacent to the failed link on the main ring are port 42 of transmission node S4 and port 52 of transmission port S5, and ports 42 and 52 disable the forwarding function of the protected data VLAN and the sub-ring control VLAN 4.

Step S114, the transmission nodes on the main ring not adjacent to the failed link carry out a hardware forwarding for the control protocol message of the sub-ring in the data plane; as shown in FIG. 13, the transmission nodes on the main ring not adjacent to the failed link include nodes S6, S2 and S3 which send, through hardware forwarding, the control message on VLAN 4 in the data plane.

Step S1116, if no single point failure occurs in the links of the main ring, then, each node on the main ring determines whether the message is a sub-ring control message via a corresponding domain field in the message head; if yes, determine whether the node receiving the sub-ring control message is the main node of the main ring; if yes, step S1118 is executed; otherwise, step S1120 is executed.

Figure 14:
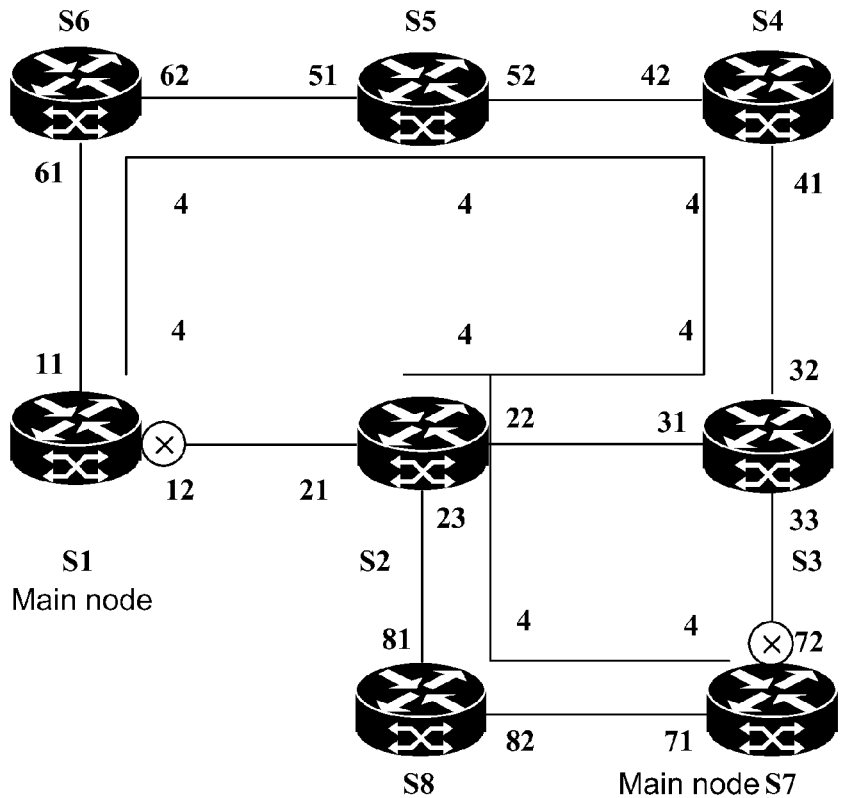
FIG. 14 is a third schematic diagram illustrating the topology of a multi-ring Ethernet according to embodiment 1 of the present invention.

Step S1118, if no failure occurs in the links on the main ring, the main node on the main ring disables the forwarding function of the protected data VLAN and the sub-ring control VLAN of the slave port, i.e., the slave port of the main node of the main ring blocks the forwarding of a data message and the sub-ring control message to avoid the occurrence of a loop on the main ring; FIG. 14 is a third schematic diagram illustrating the topology of a multi-ring Ethernet according to embodiment 1 of the present invention. As shown in FIG. 14, slave port 12 of main node S1 on the main ring disables the forwarding function of the protected data VLAN and control VLAN 4 of the sub-ring so that the control message of the sub-ring is not forwarded.

Step S1120, the transmission nodes on the main ring carry out a hardware forwarding for the control message of the sub-ring in the data plate, as shown in FIG. 14, nodes S2-S6 are transmission nodes on the main ring which send, through hardware forwarding, the control message on sub-ring control VLAN 4 in the data plane, therefore, the delay in the processing of the sub-ring control message in the main ring node is reduced.

Embodiment 2

The application of the sub-ring control message transmission method provided in the present invention in a protection protocol switching of a multi-ring Ethernet is described below in detail in combination with an embodiment.

Figure 15:
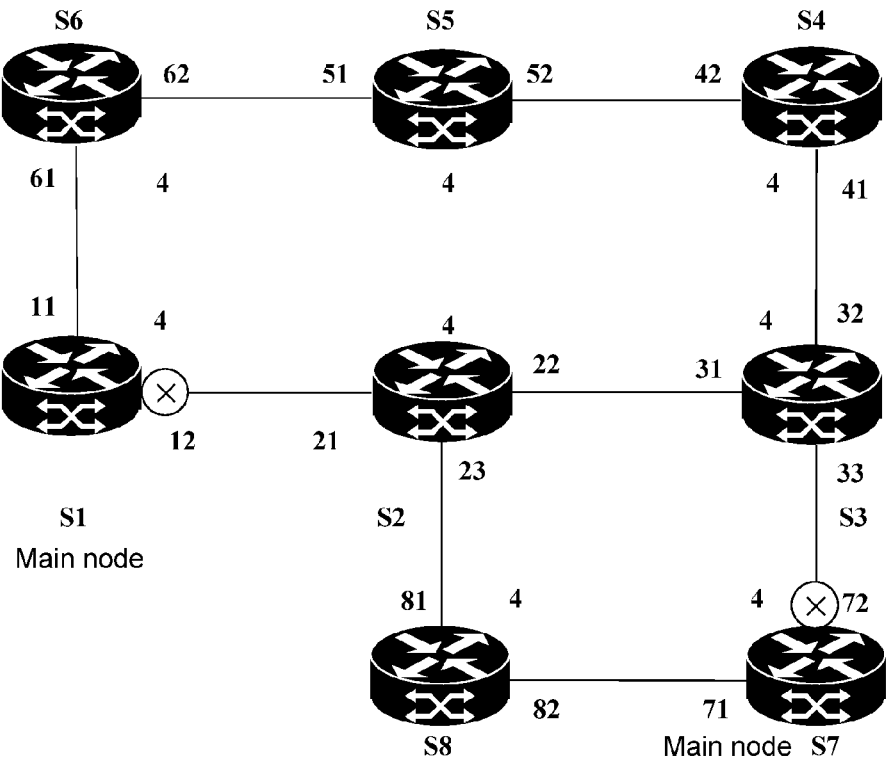
FIG. 15 is a first schematic diagram illustrating the topology of a multi-ring Ethernet according to Embodiment 2 of the present invention.

FIG. 15 is a first schematic diagram illustrating the topology of a multi-ring Ethernet according to Embodiment 2 of the present invention. As shown in FIG. 15, node S1 is a main node on a main ring, a link connected with port 12 of node S1 is a ring protection link of the main ring; node S7 is a main node of a sub-ring, a link connected with port 72 of node S7 is a ring protection link of the sub-ring; VLAN 4 is an extremely special control VLAN, which is a sub-ring control VLAN, and in which a sub-ring control message is transmitted; and nodes S1-S6 on the main ring send the sub-ring control message by a way of data message forwarding.

Figure 16:
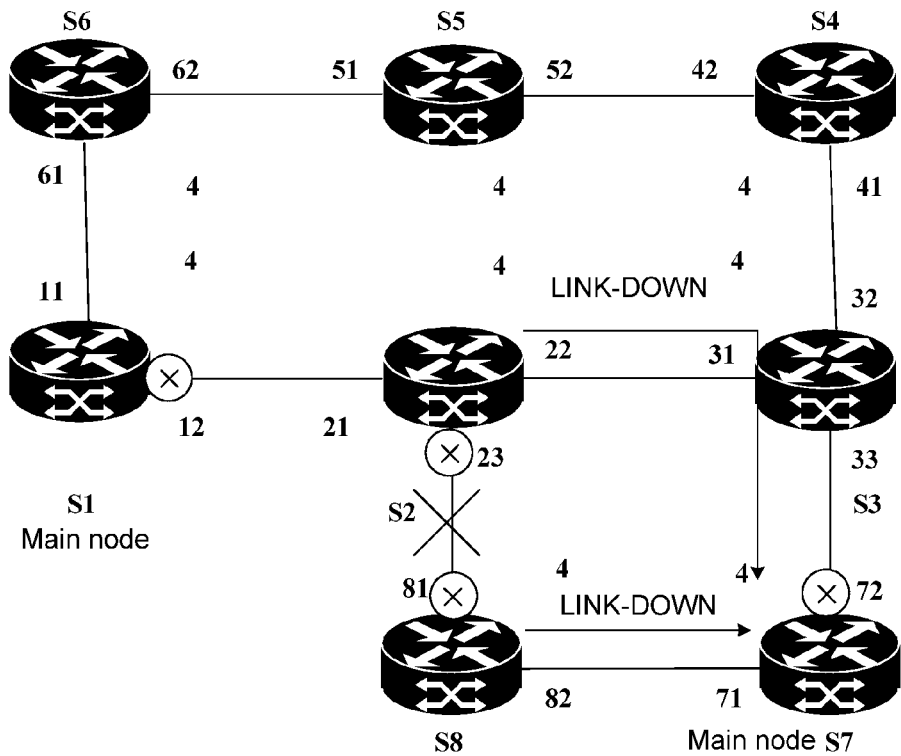
FIG. 16 is a second schematic diagram illustrating the topology of a multi-ring Ethernet according to Embodiment 2 of the present invention.

FIG. 16 is a second schematic diagram illustrating the topology of a multi-ring Ethernet according to Embodiment 2 of the present invention. As shown in FIG. 16, if the link between node S8 and node S2 is failed, after detecting the link failure, nodes S8 and S2 respectively disable the data forwarding function of ports 81 and 23 and send a control message LINK-DOWN from port 82 of node S8 and port 22 of node S2; according to the method of the present invention, the control message of the sub-ring is forwarded by a main ring node as a data message; if no link failure occurs in the main ring, slave port 12 of main node S1 of the main ring blocks the control message LINK-DOWN sent from the sub-ring so that the control message LINK-DOWN can only be forwarded along nodes S2 and S3 in the main ring, which prevents the control message LINK-DOWN forming a data loop in the main ring; additionally, nodes S2 and S3 carry out, only in a data plane, a hardware forwarding for the control message LINK-DOWN, which speeds up the forwarding of the control message in the main ring and enables main node S7 of the sub-ring to be notified of the failure much earlier.

Figure 17:
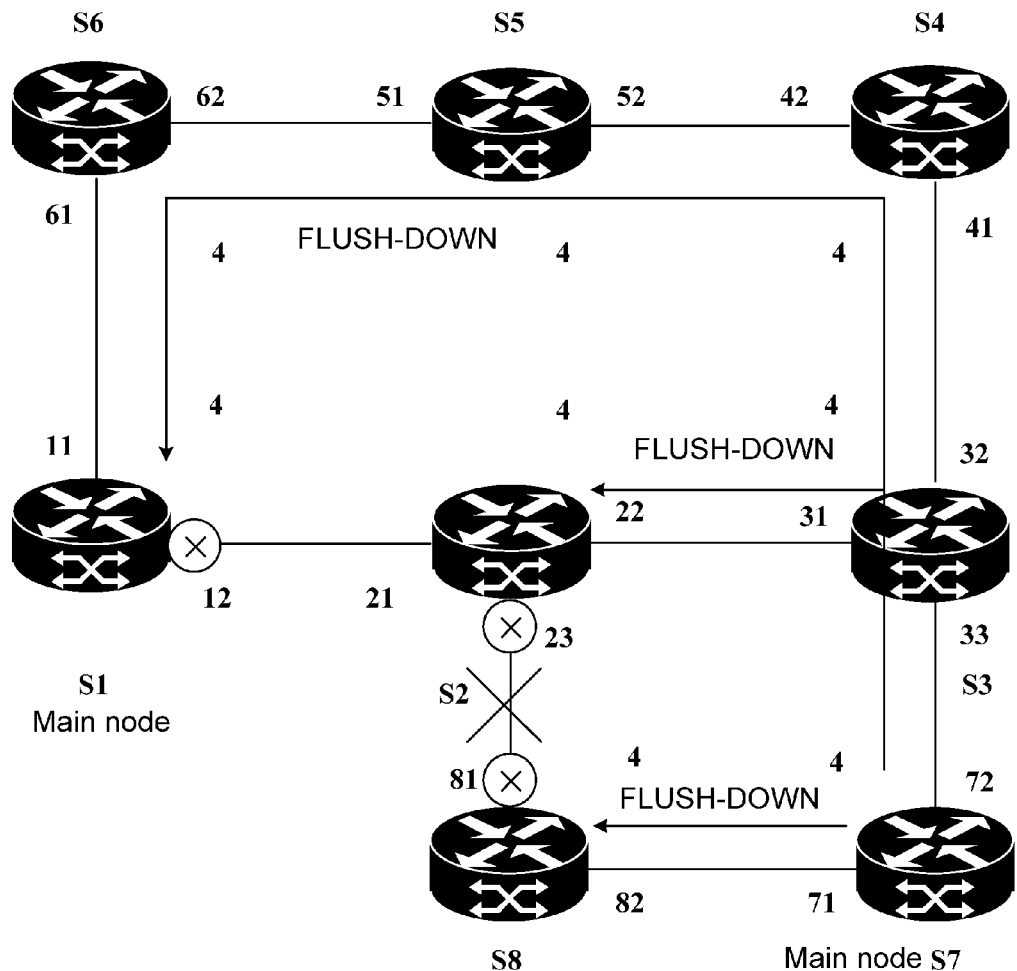
FIG. 17 is a third schematic diagram illustrating the topology of a multi-ring Ethernet according to Embodiment 2 of the present invention.

FIG. 17 is a third schematic diagram illustrating the topology of a multi-ring Ethernet according to Embodiment 2 of the present invention. As shown in FIG. 17, after receiving the control message LINK-DOWN, main node S7 of the sub-ring enables the data forwarding function of slave port 72 and synchronously sends a control message FLUSH-DOWN to the outside, and the MAC table of each node is updated; according to the method provided in the present invention, the control message FLUSH-DOWN sent from the sub-ring is processed by the main ring node as a data message; if no link failure occurs in the main ring, slave port 12 of main node S1 of the main ring blocks the control message FLUSH-DOWN sent from the sub-ring to prevent the control message FLUSH-DOWN forming a data loop in the main ring; additionally, nodes S2-S6 first copy the control message FLUSH-DOWN and submit the copy to the control plane of the nodes and then carry out a hardware forwarding for the copy in their data plane; by applying the mechanism above, the forwarding speed of the sub-ring control message FLUSH-DOWN in the main ring is improved, and the MAC table can be updated by the main ring node much earlier.

By means of the processing of this embodiment, the method, by which the main ring node can directly forward a sub-ring control message via a data plane, without waiting a control plane to process the sub-ring control message, can speed up the sub-ring control message processing of the main ring node, prevent the sub-ring control message forming a loop in the main ring, and consequentially improve the protective switching quality and protective switching speed of the whole multi-ring Ethernet.

Device Embodiment

According to an embodiment of the present invention, a device for transmitting a control message based on a multi-ring Ethernet is provided, wherein the multi-ring Ethernet comprises: a main ring having a plurality of main ring nodes and a sub-ring having a plurality of sub-ring nodes including a sub-ring control node, wherein the plurality of main ring nodes include a main ring control node, and the plurality of sub-ring nodes include a sub-ring control node.

Figure 18:
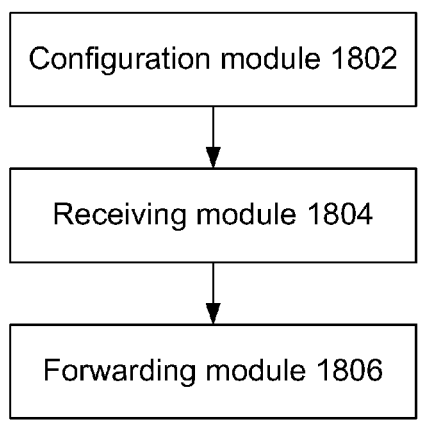
FIG. 18 is a structure diagram of a device for transmitting a control message based on a multi-ring Ethernet according to an embodiment of the present invention.

FIG. 18 is a structure diagram of a device for transmitting a control message based on a multi-ring Ethernet according to an embodiment of the present invention. As shown in FIG. 18, the device comprises a configuration module 1802, a receiving module 1804 and a forwarding module 1806, which are respectively described below in detail.

In the device shown in FIG. 18:

the configuration module 1802 is used for configuring control VLANs of a main ring and a sub-ring;

the receiving module 1804 is connected with the configuration module 1802 to receive a sub-ring control message from the sub-ring; and the forwarding module 1806 is connected with the receiving module 1804 to forward the sub-ring control message to the other main ring nodes in the main ring via a data plane.

Figure 19:
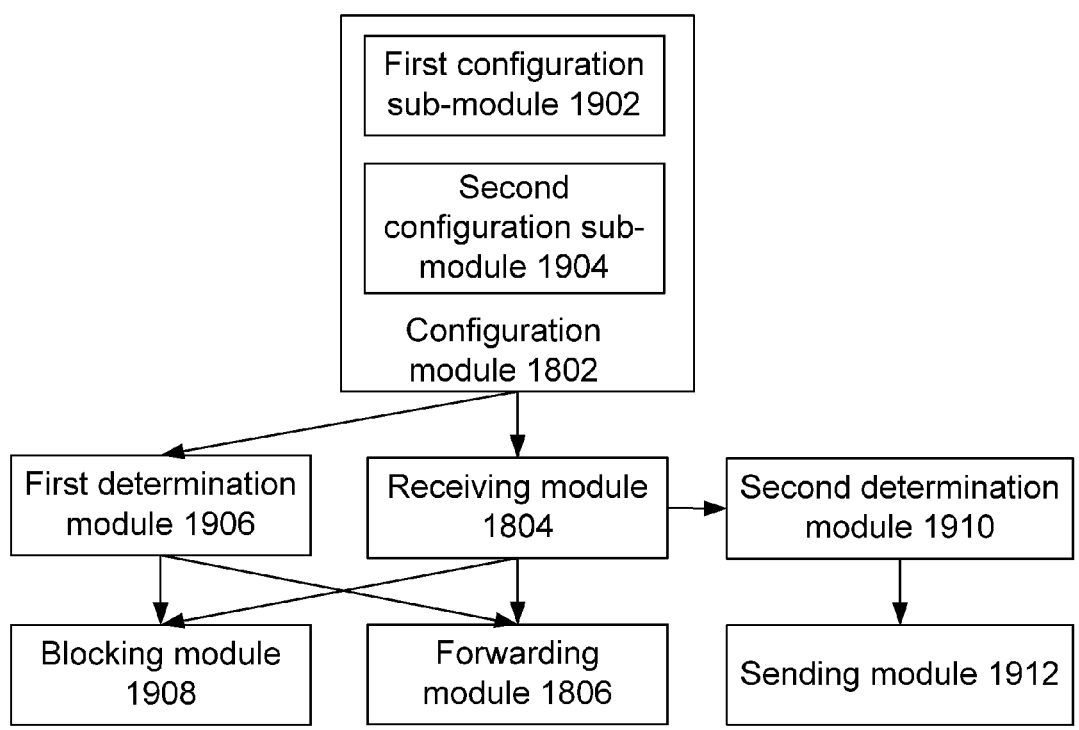
FIG. 19 is a detailed structure diagram of a device for transmitting a control message based on a multi-ring Ethernet according to an embodiment of the present invention.

FIG. 19 is a detailed structure diagram of a device for transmitting a control message is based on a multi-ring Ethernet according to an embodiment of the present invention. As shown in FIG. 19, the device preferably structurally comprises: a first configuration sub-module 1902, a second configuration sub-module 1904, a first determination module 1906, a blocking module 1908, a second determination module 1910 and a sending module 1912, which are respectively described below in detail:

the configuration module 1802 specifically comprises: the first configuration sub-module 1902 for configuring the control VLAN of the main ring, wherein the configuration involves all the ports on the main ring; and the second configuration sub-module 1904 for configuring the control VLAN of the sub-ring, wherein the configuration involves all the ports on the sub-ring and the main ring;

the first determination module 1906 is connected with the configuration module 1802 and the forwarding module 1806 to determine whether all the links of the main ring are normal;

the blocking module 1908 is connected with the first determination module 1906 and the receiving module 1804 to block the forwarding of a data message and a sub-ring control message;

the second determination module 1910 is connected with the receiving module 1804 to determine whether the sub-ring control message needs a control plane processing; and the sending module 1912 is connected with the second determination module 1910 to send the sub-ring control message to a control plane.

Specifically, after the control VLANs are configured by the first and second configuration modules 1902 and 1904, the first determination module 1906 determines whether all the links of the main ring are normal, where the links of the main ring are determined normal by the first determination module 1906, if the main ring node receiving the sub-ring control message is a main ring control node, the blocking module 1908 disables the data message/sub-ring control message forwarding function of the is slave port of the main control ring node, otherwise, the forwarding module 1806 forwards the sub-ring control message via a data plane, and where the links of the main ring are determined abnormal by the first determination module 1906, if the main ring node receiving the sub-ring control message is a main ring control node, the data message/sub-ring control message forwarding function of the slave port of the main ring control node is enabled, otherwise, a determination is made on whether the main ring node receiving the sub-ring control message is a node adjacent to the failed link, and, if the main ring node receiving the sub-ring control message is determined to be a node adjacent to the failed link, the blocking module 1908 disables the data message/sub-ring control message forwarding of the port of the node adjacent to the failed link, otherwise, the forwarding module 1806 forwards the sub-ring control message via the data plane.

Further, before the forwarding module 1806 forwards the sub-ring control message, the second determination module 1910 determines whether the sub-ring control message needs a control plane processing, and the sending module 1912 sends the sub-ring control message to a control plane if the second determination module 1910 determines the sub-ring control message needs a control plane processing.

In this embodiment, the main ring node forwards the sub-ring control message via the data plane without waiting a control plane to process the sub-ring control message, therefore, the problems existing in the current multi-ring Ethernet protection technologies that a main ring node needs extra time to process a sub-ring control message during the transmission of the control message and that a control message loop is caused by the transmission of a control message over a main ring are solved, and the performance of the network is consequentially improved.

Apparently, it should be understood by those skilled in this art that the modules or steps of the present invention can be realized by a universal computer, centralized on a single computer or distributed on a network consisting of multiple computers, and optionally realized by computer-executable program codes; the modules or steps can be therefore stored in a storage device to be executed by a computer or separately manufactured into integrated circuit modules, or some of the modules or steps are manufactured into a single integrated circuit module. Thus, the present invention is not limited to any special combination of hardware and software.

The mentioned above is only preferred embodiments of the present invention but not limitation for the present invention, various modification and variations can be devised by those skilled in this art, and it should be understood that any modification, equivalent and improvement devised without departing from the spirit and scope of the present invention belong to the protection scope of the present invention.

What is claimed is:

1. A method for transmitting a control message based on a multi-ring Ethernet, the method comprising:

controlling control virtual local area networks of a main ring and a sub-ring, wherein the multi-ring Ethernet comprises the main ring having a plurality of main ring nodes and the sub-ring having a plurality of sub-ring nodes, the plurality of main ring nodes include a main ring control node, and the plurality of sub-ring nodes include a sub-ring control node;

receiving, at a main ring node, a sub-ring control message from the sub-ring;

forwarding the sub-ring control message to other main ring nodes on the main ring via a data plane, and synchronously realizing blocking or opening of the sub-ring control message and a data message in the data plane;

configuring the control virtual local area network of the main ring in the main ring, and configuring the control virtual local area network of the sub-ring in the sub-ring and/or a virtual channel located between interconnection nodes of the main ring and provided for a sub-ring protocol message, wherein the interconnection nodes are common nodes between the main ring and the sub-ring;

wherein the step of configuring the control virtual local area networks of the main ring and the sub-ring further comprises:

configuring the control virtual local area network of the main ring, involving all ports on the main ring; and configuring the control virtual local area network of the sub-ring, involving all ports on the sub-ring and the main ring, and wherein after configuring the control virtual local area networks of the main ring and the sub-ring, the method further comprising:

determining whether all the links of the main ring are normal.

2. The method according to claim 1, wherein if the links of the main ring are determined normal, further comprising:

if the main ring node receiving the sub-ring control message is the main ring control node, then a slave port of the main ring control node blocking the forwarding of the data message and the sub-ring control message; and if the main ring node receiving the sub-ring control message is not the main ring control node, then the main ring node forwarding the sub-ring control message via the data plane.

3. The method according to claim 1, wherein if one of the links of the main ring is determined failed, further comprising:

if the main ring node receiving the sub-ring control message is the main ring control node, then a slave port of the main ring control node forwarding the data message and the sub-ring control message;

if the main ring node receiving the sub-ring control message is not the main ring control node, then a further determination being made on whether the main ring control node receiving the sub-ring control message is a node adjacent to the failed link;

if yes, then the port of the node adjacent to the failed link blocking the data message and the sub-ring control message; and otherwise, the main ring node forwarding the sub-ring control message via the data plane.

4. The method according to claim 2, wherein before forwarding the sub-ring control message, further comprising:

determining whether the sub-ring control message needs a control plane processing; and sending the sub-ring control message to a control plane where the sub-ring control message needs the control plane processing.

5. A device for transmitting a control message based on a multi-ring Ethernet, the device comprising:

a configuration module which is used for configuring control virtual local area networks of a main ring and a sub-ring, wherein the multi-ring Ethernet comprises the main ring having a plurality of main ring nodes and the sub-ring having a plurality of sub-ring nodes, the plurality of main ring nodes include a main ring control node, and the plurality of sub-ring nodes include a sub-ring control node wherein the configuration module specifically comprises:

a first configuration sub-module which is used for configuring the control virtual local area network of the main ring, and the configuration involves all the ports on the main ring; and a second configuration sub-module which is used for configuring the control virtual local area network of the sub-ring, and the configuration involves all the ports on the main ring and the sub-ring;

a receiving module which is used for receiving a sub-ring control message from the sub-ring;

a forwarding module which is used for forwarding the sub-ring control message to other main ring nodes in the main ring via a data plane;

a first determination module which is used for determining whether all the links of the main ring are normal; and a blocking module which is used for blocking the forwarding of a data message and the sub-ring control message.

6. The device according to claim 5, further comprising:

a second determination module which is used for determining whether the sub-ring control message needs a control plane processing; and a sending module which is used for sending the sub-ring control message to a control plane.

7. The method according to claim 3, wherein before forwarding the sub-ring control message, further comprising:

determining whether the sub-ring control message needs a control plane processing; and sending the sub-ring control message to a control plane where the sub-ring control message needs the control plane processing.

* * * * *

UNITED STATES PATENT AND TRADEMARK OFFICE
CERTIFICATE OF CORRECTION

PATENT NO. : 8,462,795 B2
APPLICATION NO. : 13/060678
DATED : June 11, 2013
INVENTOR(S) : Bin Wang et al.

Page 1 of 1

It is certified that error appears in the above-identified patent and that said Letters Patent is hereby corrected as shown below:

On the Title Page

Please check the spelling of the following:
(74) Attorney, Agent, or Firm - Oppendahl Patent Law Firm LLC And insert the following correction:
-- (74) Attorney, Agent, or Firm - Oppedahl Patent Law Firm LLC --

Signed and Sealed this
Twenty-seventh Day of August, 2013

Teresa Stanek Rea
*Acting Director of the United States Patent and Trademark Office*